(12) United States Patent
Kiamilev et al.

(10) Patent No.: US 7,522,671 B2
(45) Date of Patent: Apr. 21, 2009

(54) APPARATUS AND METHOD FOR TRANSMITTING AND RECEIVING HIGH-SPEED DIFFERENTIAL CURRENT DATA BETWEEN CIRCUIT DEVICES

(75) Inventors: Fouad Kiamilev, Newark, DE (US); Joshua Kramer, Newark, DE (US); Yongrong Zuo, Newark, DE (US)

(73) Assignee: University of Delaware, Newark, DE (US)

( * ) Notice: Subject to any disclaimer, the term of this patent is extended or adjusted under 35 U.S.C. 154(b) by 584 days.

(21) Appl. No.: 11/324,233

(22) Filed: Jan. 4, 2006

(65) Prior Publication Data

US 2006/0227896 A1 Oct. 12, 2006

Related U.S. Application Data

(60) Provisional application No. 60/641,005, filed on Jan. 4, 2005.

(51) Int. Cl.
*H04B 3/00* (2006.01)
*H04L 25/00* (2006.01)
(52) U.S. Cl. .................. 375/257; 375/296; 375/297; 455/127.1; 455/522
(58) Field of Classification Search .............. 375/357, 375/296, 297; 455/127.1, 522
See application file for complete search history.

(56) References Cited

U.S. PATENT DOCUMENTS 6,405,052 B1 * 6/2002 Faber .................... 455/522
2002/0136357 A1 * 9/2002 Suonsivu et al. ........ 379/1.04

* cited by examiner

*Primary Examiner*—Curtis B Odom
(74) *Attorney, Agent, or Firm*—RatnerPrestia

(57) ABSTRACT

An apparatus and method for an interface for transmitting high speed data between circuits. A driver circuit produces first and second differential currents from a digital signal that drive first and second transmission lines. A receiver is connected through first and second terminating resistors to said transmission lines. The resistive elements are in turn connected to first and second common base amplifiers where the differential currents are converted to a differential voltage. The input impedance to the first and second common-base amplifiers is further lowered by a differential amplifier having inputs connected to the inputs of the common-base amplifiers, and an output connected to the bases of said common-base amplifiers. As a result, voltage conversion of the differential signals takes place in the common-base amplifiers and not in the terminating resistors, reducing the level of the differential currents and permitting an increase in the digital data rate. In addition, a common-gate amplifier configuration of the present invention is provided as well as a method for dynamically determining an optimal transmit power level for the driver circuit and for performing an accelerated bit error rate measurement.

2 Claims, 4 Drawing Sheets

APPARATUS AND METHOD FOR TRANSMITTING AND RECEIVING HIGH-SPEED DIFFERENTIAL CURRENT DATA BETWEEN CIRCUIT DEVICES

GOVERNMENT RIGHTS

This application is based on subject matter developed pursuant to DARPA Contract FA 8650-04-C-7120/Subcontract 19779.

BACKGROUND OF THE INVENTION

The present invention provides a driver and a receiver circuit for transmitting high-speed data between electronic devices. Specifically, a receiver and associated driver circuit form an interface circuit for transferring data at high speeds between circuit devices.

Battery operated, portable and handheld electronic devices such as, mobile phones, portable entertainment consoles, personal digital assistants (PDAs), global positioning systems (GPS) and gaming devices, are evolving to the point where internal data transfers may occur at rates in excess of 100 megabits per second. It is expected that such portable and handheld devices are likely to require internal data transfers in excess of 1 gigabit per second. These faster data rates represent an increase of 10 to 100 times over current data transfer rates between devices. Background art interfaces operating at gigabit speeds per second consume too much power to be efficiently used in such portable or handheld electronic devices. Thus, background art current mode logic (CML) or low voltage differential signaling (LVDS) interface, as will be explained below, have power/speed performance metrics that would be unsuitable for portable or handheld devices with gigabit data transfer rates.

In addition, a problem associated with transmission paths that transmit such high-speed data is that they produce electromagnetic emissions that can cause electromagnetic interference (EMI) in their environment. The issue of EMI is exasperated by a necessary increase in power consumption for the driver and receiver circuits when they operate at these higher frequencies associated with gigabit data transfer rates.

Background art driver and receiver circuits typically operate over a differential connection that has a 50 ohm impedance transmission line geometry. The differential currents carried by the transmission lines are converted at the receiver to a voltage using a 50 ohm termination impedance. The currents must be large enough so that the voltage developed across the 50 ohm termination impedance is sufficiently above the voltage noise floor to reliably detect the digital signal. Since the standard termination impedance is 50 ohms per line, the transmission of current must be in the order of a few milliamperes in order to produce the few hundreds of millivolts necessary for reliable detection. In the background art CML or LVDS transmitter-receiver standards, a transmission of a current of eight milliamperes is typically required to achieve this result over distances up-to 40 inches. Thus, another problem with background art devices is that the same current level is used regardless of the link distance.

Therefore, there is a need in the art for interface devices with power/speed performance metrics that would be suitable for portable or handheld devices with gigabit data transfer rates and with the ability to adjust current level requirements in accordance with distance in order to further reduce power consumption.

SUMMARY OF THE INVENTION

The present invention provides for high-speed digital signaling at lower transmit current levels that can be reliably converted to a detectable voltage while maintaining a 50 ohm termination impedance on the transmission line. The present invention uses transmit current levels on the order of tens to hundreds of microamperes over distances of 1 to 10 inches. Though higher transmit current is necessary for longer distances because of the significant attenuation effects in long metallic wires that result in loss of transmitted signal amplitude or power, the present invention provides for dramatic reduction in power consumption of interface circuits that operate over short link distances of 1 to 10 inches.

In addition, the ability of the present invention to adjust transmit current level based on link distance is a key advantage of the present invention over the background art. High transmit current levels result in high transmit power that then dominates the power consumption of the interface circuit.

The present invention is an apparatus and method for transmitting and receiving high-speed differential current data between circuit devices. In particular, the apparatus comprises a driver circuit and receiver circuit that form an interface for transmitting and receiving differential high-speed signals over a transmission line. The transmission line is terminated at a receiver end by one end of a resistive element. The second end of the resistive element feeds a common base transistor amplifier and the base of a common emitter amplifier. The two amplifiers are connected so that the gain of the common emitter amplifier further lowers the input impedance of the common-base amplifier emitter connection. The common-base transistor amplifier converts the received signal current into a voltage on the collector, and the transmission line terminating resistive element is essentially unaffected by the connected amplifier circuits.

In accordance with a preferred embodiment, a differential current is transmitted over two transmission lines to a receiver. The receiver includes first and second resistive elements, each having one end connected to an input of a respective first and second common-base transistor amplifier. A differential amplifier has a first and second inputs connected, respectively, to the one end of first and second resistive elements. The collectors of the differential amplifier are connected to the bases of the first and second common-base transistor amplifiers. The effect is to reduce the total impedance seen by the first and second resistive elements so that the transmission line termination impedance is effectively the impedance of the first and second terminating resistive elements.

In accordance with another embodiment of the present invention, a driver circuit comprising a differential amplifier circuit produces first and second currents to drive first and second transmission lines. The operating voltage for running the driver circuit differential amplifier is obtained from the receiver circuit through the first and second transmission lines.

In the following paragraph, the terms drain and source are interchangeable to provide an alternative configuration of the present invention. Another embodiment of the present invention is An interface for transmitting and receiving differential currents transmitted over first and second transmission lines comprising: a driver circuit for supplying a differential current to said first and second transmission lines comprising: a differential amplifier circuit having first and second signal inputs connected to the base connections of first and second differential transistors, said transistors having collector connections connected to said transmission lines; a resistor connected between collector connections of said first and second differential transistors; and a current source connected to emitter connections of said differential transistors.

In addition, this embodiment further includes a receiver comprising: first and second resistive elements having one end connected to respective of said first and second transmission lines; a first common-gate amplifier connected to receive a second end of said first resistive element on a source connection thereof, and producing a voltage signal on a respective drain connection; a second common-gate amplifier connected to receive a second end of said second resistive element on a source connection thereof, and producing a voltage signal on a respective drain connection; a differential amplifier having first and second inputs connected, respectively, to said first and second resistive elements second ends; having first and second drains, respectively, connected to first and second sources, respectively, of a cascode amplifier; and having first and second sources connected to ground; first and second drain resistors connecting respective drains of said first and second common-gate amplifiers to a terminal of a power supply; and first and second active load transistors having first and second gates interconnected, having first and second sources, respectively, connected to first and second drains of said cascode amplifier and having said first and second drains connected to said power supply, wherein a differential current received by said first and second resistive elements is converted to a differential voltage on said common-gate amplifiers drain connections.

In this paragraph, the use of the phrase "transmitter power" or "transmit power" is synonymous with the phrase "transmit current." In yet another embodiment of the present invention is a method for determining the optimal transmitter power setting, comprising: turning on a channel link; setting transmitter power to a maximum value; setting a target maximum bit error rate for the channel link; performing an accelerated bit error rate measurement (ABERM); testing whether the ABERM was successful; calculating and setting the transmitter power to achieve the target maximum bit error rate when the ABERM is successful; determining whether the bit error rate can be increased when the ABERM is not successful; determining whether more transmitter power is needed than is available to achieve the target maximum bit error rate; reporting an error if more power is needed than is available for the target maximum bit error rate; and running the ABERM with a new target maximum bit error rate when it is determined that more power is needed than is available.

Yet another embodiment of the present invention is a method for performing an ABERM, comprising: running a linear feedback shift register (LFSR) configured to generate the test and checker data; reducing transmitter power to a level such that the bit error rate measurement can be accelerated; checking the bit error rate at the reduced transmitter power; determining whether the error rate is at least equal to a predetermined value; setting a value for a number of measurements to be taken; recording an error rate and a transmitter power at an initial transmitter power; increasing the transmitter power; recording the error rate and the transmit power until a predetermined value for the number of measurements has been obtained; performing a linear fit of data; calculating the transmit power for a target bit error rate; determining whether the transmit power for the target bit error rate is possible; reporting an error if the transmit power for the target bit error rate is not possible and setting the transmit power to a maximum; and setting the transmit power for the target bit error rate when the transmit power is possible.

DESCRIPTION OF THE PREFERRED EMBODIMENTS

Figure 1:
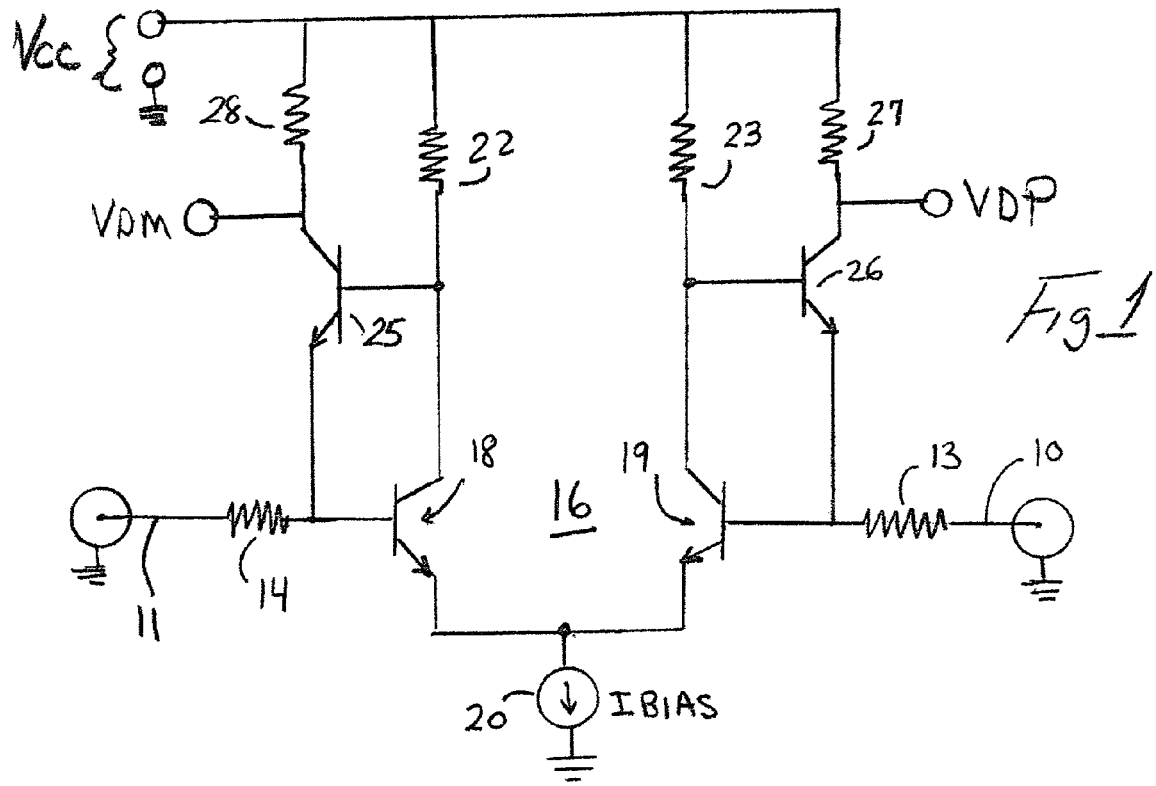
FIG. 1 shows a receiver circuit for converting and receiving differential high-speed digital signal current into a digital voltage signal.

Referring now to FIG. 1, a receiver for high-speed differential digital signals is shown. Transmission lines 10, 11 carry differential digital signals from a driver circuit to one side of terminating resistances 13, 14, respectively. Terminating resistances 13 and 14 are selected to be as close in value to the characteristic impedance of the transmission lines 10 and 11 as possible. Transmission lines 10 and 11 can be for example, wire or other conductors that have a length that acts as a transmission line at the frequencies higher than 1 gigabit per second. It should be noted that lengths of wire or other conductors of just a few inches exhibit transmission line characteristics at these high frequencies.

Each of the terminating resistances 13 and 14 are connected to the emitters of a first and second common-base amplifier circuit 26, 25, respectively. The common-base amplifier circuits comprise transistors 25 and 26, and collector resistors 28 and 27, respectively. The impedance looking into the emitters of the common-base amplifier circuits have impedance defined usually as $V_t/Ic$. $V_t$ is the thermal voltage constant of approximately 26 millivolts, and in a typical circuit, the collector current (Ic) might be in the neighborhood of 200 microamperes.

As shown in FIG. 1, the input impedance seen by the terminating resistance elements 13 and 14 is further lowered by the differential amplifier 16. Differential amplifier 16 provides gain which is ½ gm×RL, where RL is the value of collector resistors 22, 23 of the differential amplifier 16, gm is the transconductance defined as $Ic/V_t$. This, differential amplifier, in turn, lowers the input impedance of the common-base amplifiers 25, 26. With a typical collector current (Ic) of 200 microamperes, the gain of the differential amplifier 16 would be approximately 20. Whereas, the normal input impedance to each of the emitter connections of common-base amplifier transistors 25 and 26 might be in the neighborhood of 130 ohms, the gain of differential amplifier 16 of approximately 20 reduces the input impedance of transistors 25 and 26 to approximately 5 to 6 ohms.

In addition, the primary impedance terminating the transmission lines 11 and 10 is therefore essentially the value of the terminating resistors 13 and 14, which are selected to be near the characteristic impedance of transmission lines 10 and 11.

The received differential currents are converted into output differential voltages labeled as VDM and VDP, in FIG. 1. These output differential voltages VDM and VDP are amplified to a usable signal level through collector resistors 28 and 27, respectively. As shown in FIG. 1, a current source 20 provides the tail current for transistors 18 and 19 of differential amplifier 16. A power supply voltage, shown as $V_{CC}$ in FIG. 1, is applied between collector resistors 22, 23, 27 and 28 and ground.

The foregoing is an implementation that uses BICMOS integrated circuit technology. Those skilled in the art will recognize, however, that the bipolar transistors could be replaced with MOSFET transistors to derive a CMOS implementation. The bias current, IBIAS and current to voltage resistance values of resistor 28 and 27 are selected according to a desired data rate for the receiver. A higher data rate requires a larger bias current and lower resistor values. The power supply voltage VCC can be as low as 2½ volts for BICMOS implementations, but can be even lower in CMOS implementations.

Figure 3:
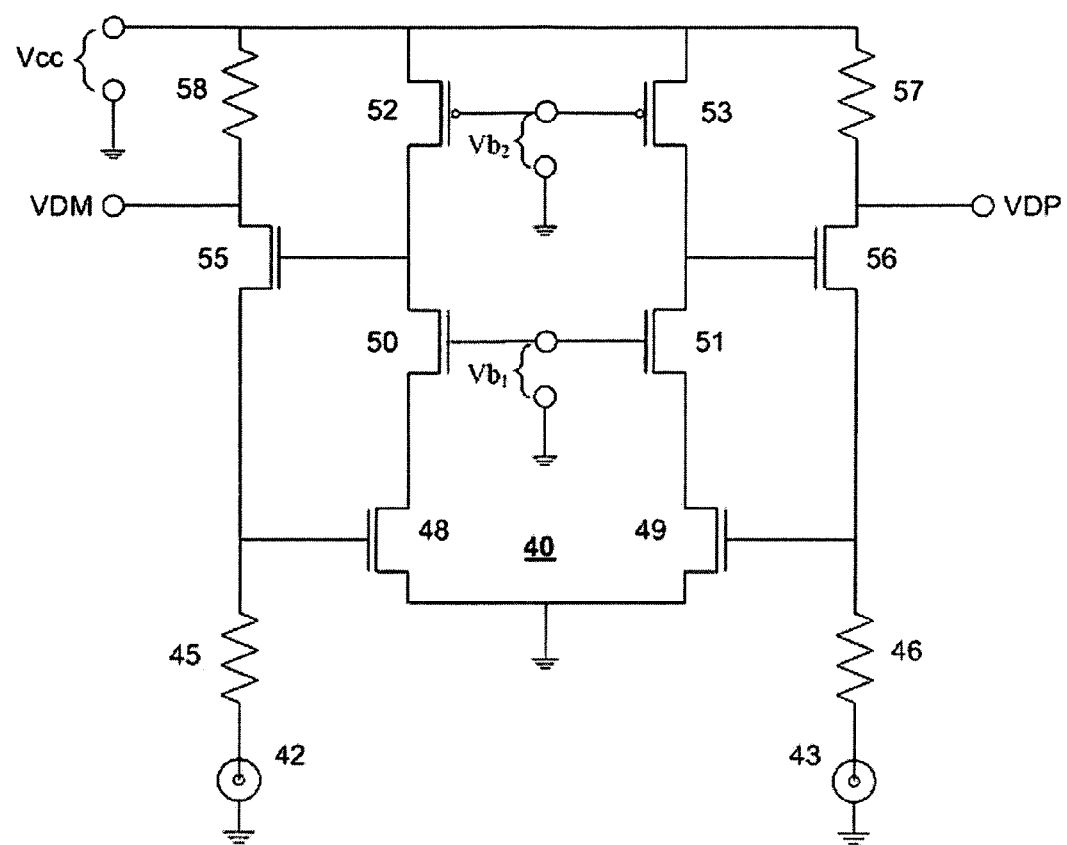
FIG. 3 illustrates another embodiment of the receiver circuit that uses only complimentary MOSFET transistors.

An exemplary CMOS implementation of the receiver circuit that can be used for low voltage CMOS is shown in FIG. 3. The transistors 55 and 56 are configured as common-gate amplifiers and, with resistors 58 and 57, they perform the same common-base amplifier function as the transistors 25 and 26 and resistors 28 and 27, respectively, as described above. The resistors 45 and 46 perform the same termination function as described above for resistors 14 and 13, respectively. However, in the exemplary implementation of FIG. 3, resistors 45 and 46 can have larger values than the analogous resistors of FIG. 1, since the input impedance of the common-gate amplifiers 55, 56 are higher for CMOS implementation.

In addition, with the possibility of lower supply voltage in the CMOS implementation of FIG. 3, the available "headroom" makes it difficult to generate the necessary tail current. Thus, for the CMOS implementation of FIG. 3, the differential amplifier 16 shown in FIG. 1 is replaced with a pseudo-differential cascoded amplifier 40. The circuit of FIG. 3 is suitable for supply voltages in the range of 1.5 to 1.8 volts.

The cascoded amplifier 40 provides the lower input impedance of the common gate amplifiers 55, 56 shown in FIG. 3. To achieve suitable gain, both cascoding and active loads are used in the cascoded amplifier 40. The transistors 50 and 51 provide the cascoding to increase the output impedance and thus gain of the cascoded amplifier 40. The transistors 52 and 53 are active loads for the cascoded amplifier 40 which also improve the amplifier gain.

The input impedance looking into the source of the common gate amplifiers 55, 56 in the CMOS implementation of FIG. 3 is 1/gm, where gm is the transconductance of the transistor. The gain of the amplifier is typically around 15. The gm of the CMOS transistors is lower than the gm of bipolar transistors. Therefore, the input impedance at the source of transistors 55 and 56 can be around 400 ohms. With an exemplary amplifier gain of about 15 the input impedance is reduced to around 25 ohms. This input impedance can be brought down further but this would require greater power consumption. The resistive elements 45 and 46 are used in series with the input impedance to terminate the transmission lines 42 and 43 near their characteristic impedance. With an input impedance of around 25 ohms, the resistive elements 45 and 46 would be in the range of 25 ohms in order to provide a 50 ohm termination for the transmission line.

As shown in FIG. 3, the received differential currents are converted into output voltages VDM and VDP by the resistors 58 and 57, respectively. A voltage $Vb_1$ is used to bias the cascoding transistors 50 and 51 in saturation. A voltage $Vb_2$ is used to bias the active load transistors 52 and 53 in saturation as well. A power supply voltage $V_{cc}$ is applied between the common node of resistors 58 and 57 and the transistors 52 and 53 and ground.

Figure 2:
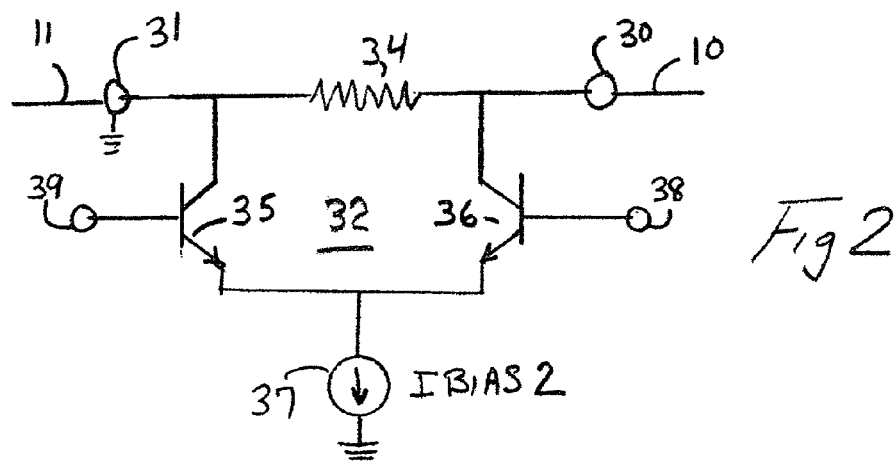
FIG. 2 illustrates a driver circuit for generating high-speed differential signal currents for transmission to the receiver.

The receiver of FIG. 1 can be driven by the exemplary driver circuit shown in FIG. 2. The driver circuit of FIG. 2 is connected via the transmission lines 10 and 11 by first and second output terminals 30 and 31 of the exemplary differential amplifier circuit 32. A single output resistance 34 of approximately 100 ohms is connected between the collectors of the transistors 35 and 36 of the differential amplifier 32. A current source 37 supplies the operating current to the differential amplifier 32. A low level digital signal is applied differentially to inputs 38 and 39 of the differential amplifier 32 where they are converted into a current signal on output terminals 30 and 31.

The connection of output terminals 30 and 31 to the input of transmission lines 10 and 11 also supplies a DC voltage to the collectors of transistors 35 and 36. The DC collector voltage of transistors 18 and 19 is coupled through the base emitter connections of transistors 25 and 26 to terminating resistance 13 and 14. During operation, a differential voltage applied to input terminals 38 and 39 splits the current from current source 37 between each of transistors 35 and 36 according to the input voltage. The split currents carry the data applied to input terminals 38 and 39 to each of the terminating resistances 13 and 14 of the receiver circuit of FIG. 1.

The interface provided by the driver circuit of FIG. 2 and receiver circuits of FIG. 1 and FIG. 3 work for data transfer rates up to 10,000 megabits per second. As a non-limiting example, for short links of 1 to 10 inches in length, the transmit current used by the presented interface circuit is on the order of tens to hundreds of microamps. For longer links, the transmit current used by the presented interface circuit is higher, on the order of few milliamps. For shorter links, the presented interface circuit can achieve dramatic reduction in power consumption of background art as illustrated from simulation results below. For longer links, the present circuit operates at higher current levels achieves power consumption comparable to the background art. A method for dynamically finding the proper transmit current (e.g., transmit power) setting is provided later in this description.

The foregoing circuit designs have been simulated and the results are compared in Table 1 below with background art interfaces. Standard CML I/O channels are known in the art for providing the interface between high-speed circuits of a device. Typically, the standard CML and custom CML I/O channels operated at much lower frequencies. In a simulation of the standard and custom CML's wherein pre-emphasis is used in the standard CML case, the total transmit power is considered excessive at a link speed of 10 gigabits/second. A performance metric is shown which comprises the power/speed of the interface, as a figure of merit. The lower the number calculated for the performance metric, the better the circuit performance.

The high power of background art CML devices is a result of using pre-emphasis circuitry, which further increases the transmit signal requiring additional transmit power gain. As to the standard CML without pre-emphasis, both the driver and receiver power consumption is upwards to 34 mW. A custom CML requires buffer power consumption in order to have sufficient current levels for transmission and detection of approximately 18 mW. Further enhancements to the custom CML can lower that power requirement to approximately 17 mW. The lower power consumption results in a better performance metric.

The three lower entries in the table are for a simulated circuit in accordance with FIGS. 1 and 2. At 2.5 gigabits per second, the power consumption is approximately 1 milliwatt, and a performance metric is achieved of 0.4. Similar data has been obtained in simulating the proposed circuit designs for 5 Gb/s and 10 Gb/s, which show a performance metric also in the range of 0.4 to 0.32.

Accordingly, the simulation results demonstrate how higher frequency data transfers may be obtained without suffering a large increase in power that is disadvantageous for products that operate from battery power. Electromagnetic radiation from the transmission lines is also reduced when the transmit current levels are reduced. The use of a standard 50 ohm resistance element to convert the current to a voltage is clearly less advantageous than the proposed design that uses active circuitry for converting the received differential currents into a differential voltage.

Figure 4:
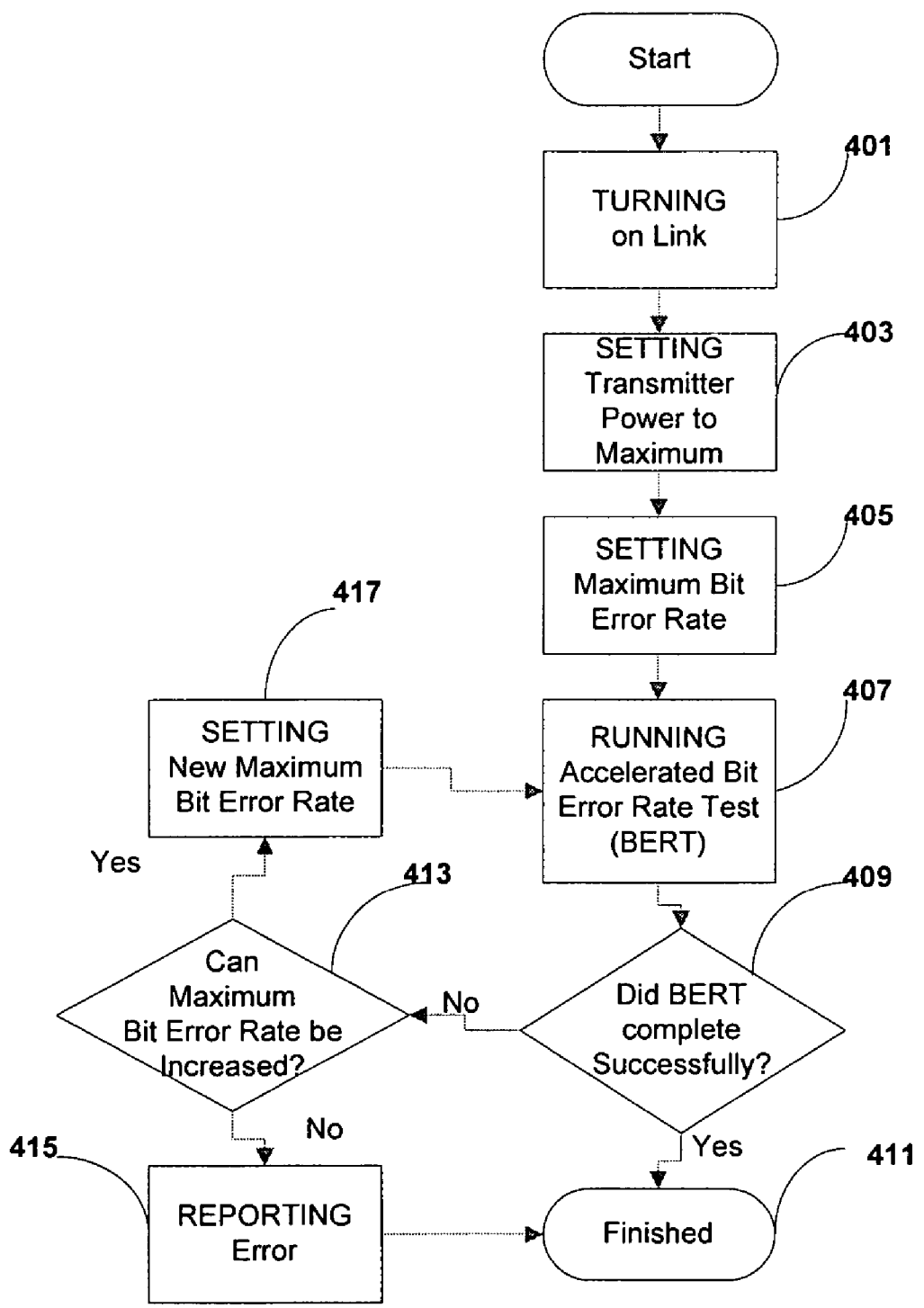
FIG. 4 is an exemplary flow diagram for the method of determining the optimal transmit power level of the present invention.

A method for determining the optimal transmitter power setting for the present invention is shown in the exemplary flow diagram of FIG. 4. As shown in FIG. 4, the channel link is turned on in step 401. In addition, at turn on, the transmitter power set to its maximum value in step 403. In step 405, a target maximum bit error rate is set for the link. In step 407, a method for determining an accelerated bit error rate measurement (ABERM) is executed. The ABERM method is shown in further detail in FIG. 5 below.

A test of whether the ABERM was successful is carried out in step 409 of FIG. 4. If the ABERM completes successfully (i.e., YES at step 409), the method calculates and sets the transmitter power to achieve the new target maximum bit error rate and concludes in step 411. Alternatively, if the ABERM does not complete successfully (i.e., NO at step 409), a test of whether the bit error rate can be increased is carried out in step 413 of FIG. 4.

The test of whether the bit error rate can be increased is carried out in step 413 of FIG. 4. If in step 413, it is determined that more power is needed than is available to achieve the target bit error rate (i.e., NO at step 413), the method reports an error in that it could not successfully complete in step 415 and concludes in step 411. Alternatively, if in step 413, then it is determined that the error rate can be increased (i.e., YES at step 413), then the ABERM (i.e., step 407) is run again with the new target error rate that is determined in step 417.

Figure 5:
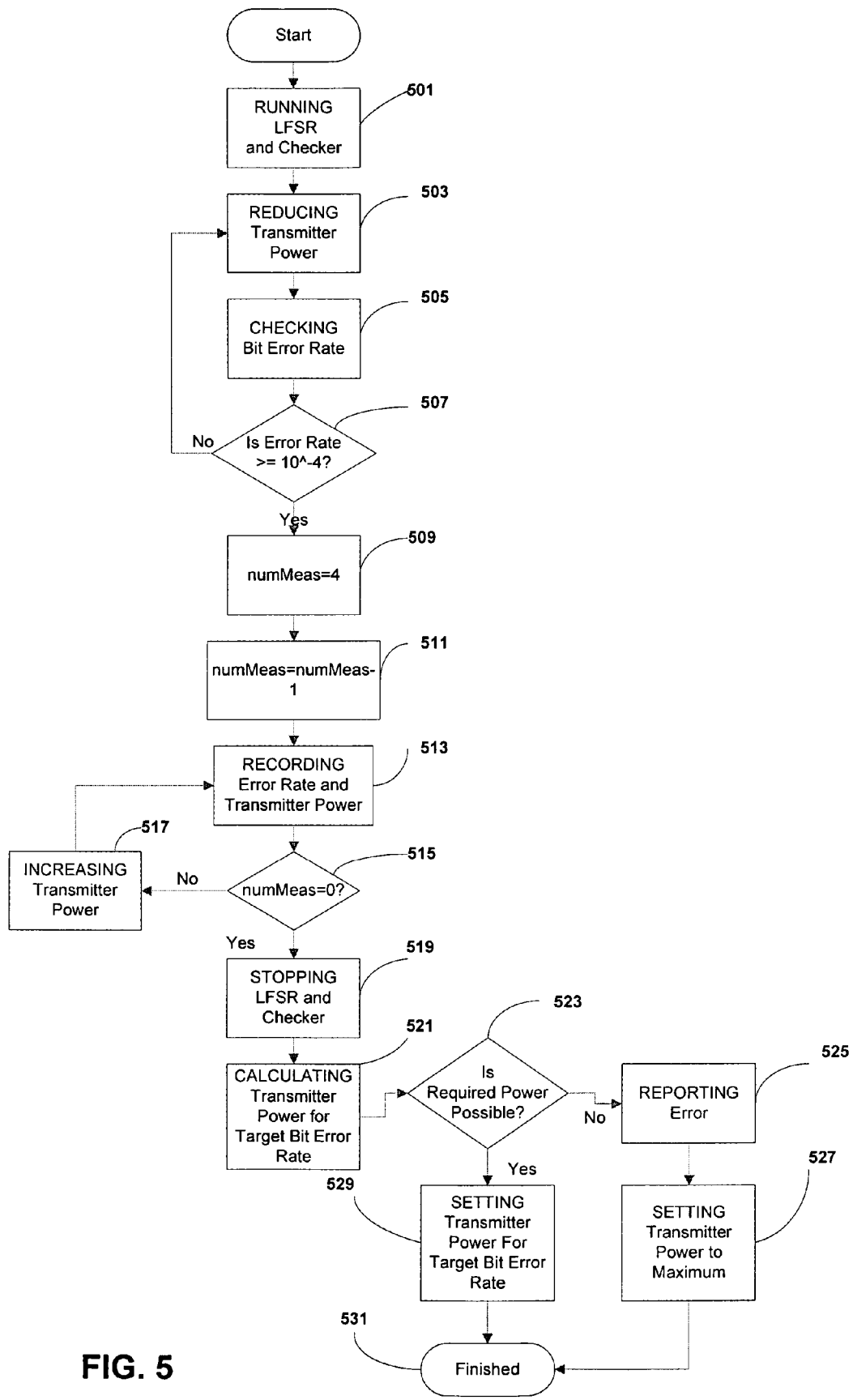
FIG. 5 is an exemplary flow diagram for performing an accelerated bit error rate measurement that is implemented by the present invention.

FIG. 5 shows an exemplary flow diagram for a method of determining the bit error rate as a function of transmitter power (e.g., for performing the ABERM). In step 501, the linear feedback shift register (LFSR) that generates the test data and the checker is started. In steps 503-507, a loop is performed to reduce the transmitter power to a level such that the bit error rate is low enough that it can be checked in a short amount of time. This loop is repeated until a sufficient error rate is obtained. Once the error rate is sufficient (e.g., in the exemplary flow diagram 1×10$^{-4}$), the parameters (i.e., number of measurements (numMeas) for performing a predetermined number of iterations of a test loop for recording the error rate and transmitter power are determined in steps 509-511. This test loop, performed in steps 513-517, records the transmitter power and the error rate (i.e., step 513) then increases the transmitter power (i.e., step 517) and records the transmit power and error rate again. This loop continues until a predetermined number of measurements (numMeas) are recorded. A linear fit of these data points is performed in step 519. Therefore, at least two data points should be generated but more will result in better accuracy.

The relation of transmitter signal power to bit error rate is:

$$\frac{S-A}{\sigma} = \frac{-c_2 + \sqrt{c_2^2 - 4c_1(c_3 + \ln(2P_e))}}{2c_1}$$

$$c_1 = 0.4926, c_2 = 0.2498, c_3 = 0.7912$$

where $P_e$ is the bit error rate, S is the maximum transmitter power; A is the attenuation amount from the maximum power and σ is the noise power seen by receiver. The linear fit of the data points gives the line formed by $$\frac{S-A}{\sigma}.$$

Therefore, given the equation of the linear fit, the value for attenuation A can be calculated for a target $P_e$. If the calculated value for the attenuation A is negative, then more power S than is available is needed to attain the target bit error rate. In step 521 of FIG. 5, the transmit power for the target bit error rate is calculated accordance with this information. In step 523, if the required transmit power is not possible (i.e., NO at step 523), an error is reported in step 525 indicating that the target bit error rate is not possible to achieve given the maximum power of the transmitter and the transmitter power is set to a maximum in step 527 and the method concludes in step 531. Alternatively, if in step 523, the required transmit power is possible (i.e., YES at step 523), the transmitter power is set for the target bit error rate in step 529 and the method concludes in step 531.

The foregoing description of the invention illustrates and describes the present invention. Additionally, the disclosure shows and describes only the preferred embodiments of the invention in the context of an apparatus and method for transmitting high-speed differential current data, but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein. Also, it is intended that the appended claims be construed to include alternative embodiments.

TABLE 1

| Description | Link Speed (Gb/s) | Total TX + RX Power (mW) | Performance Metric Power/Speed mW/Gb/s |
|---|---|---|---|
| Standard CML I/O Channel with Pre-Emphasis ON (drive > 40" FR4 traces) | 10 | 87–141[1] | 8.7–14.1 |
| Standard CML I/O Channel | 10 | 34[2] | 3.4 |
| Custom CML I/O Channel (Rev. 1.0) | 10 | 18[3] | 1.8 |
| Custom CML I/O Channel (Rev. 1.1) | 10 | 17[4] | 1.7 |

TABLE 1-continued

| Description | Link Speed (Gb/s) | Total TX + RX Power (mW) | Performance Metric Power/Speed mW/Gb/s |
|---|---|---|---|
| 2.5 Gb/s UDel MPL I/O Channel | 2.5 | 1[5] | 0.4 |
| 5 Gb/s UDel MPL I/O Channel | 5 | 2[6] | 0.4 |
| 10 Gb/s UDel MPL I/O Channel | 10 | 3.2[7] | 0.32 |

[1]Standard CML I/O Channel with Pre-Emphasis: Additional circuitry to generate pre-emphasis signal uses between 6 mA * 3.3 volt = 20 mW and 22.5 mA * 3.3 volt = 74 mW (depending on amount of pre-emphasis). Additional driver for pre-emphasis uses 5 mA * 3.3 volt + 4 mA * 1.6 volt – 23 mW. Additional receiver stages required to amplify weak input signal uses 3 mA * 3.3 volt = 9.9 mW. Total is 87–141 mW.
[2]Standard CML I/O Channel: Buffer power consumption is 5 mA * 3.3 volt. Driver power consumption is 8 mA * 1.6 volt. Receiver power consumption is 1.5 mA * 3.3 volt. Total is 34 mW.
[3]Custom CML I/O Channel (Ver. 1.0): Buffer power consumption is 2.5 mA * 3.3 volt. Driver power consumption is 4 mA * 1.25 volt. Receiver power consumption is 1.5 mA * 3.3 volt. Total is 18 mW.
[4]Custom CML I/O Channel (Ver. 1.1): Buffer power consumption is 2.5 mA * 3.3 volt. Driver power consumption is 4 mA * 1.25 volt. Receiver power consumption is 1.0 mA * 3.3 volt. Total is 17 mW.
[5]2.5 Gb/s UDel MPL I/O Channel: No Buffer is used. Driver power consumption is 0.2 mA * 2.5 volt. Receiver power consumption is 0.2 mA * 2.5 volt. Total is 1 mW.
[6]5 Gb/s UDel MPL I/O Channel: No Buffer used. Driver power consumption is 0.4 mA * 2.5 volt. Receiver power consumption is 0.4 mA * 2.5 volt. Total is 2 mW.
[7]10 Gb/s UDel MPL I/O Channel: No Buffer used. Driver power consumption is 0.8 mA * 2.5 volt. Receiver power consumption is 0.5 mA * 2.5 volt. Total is 3.2 mW.

What is claimed is:

1. A method for determining the optimal transmitter power setting, comprising:
   turning on a channel link;
   setting transmitter power to a maximum value;
   setting a target maximum bit error rate for the channel link;
   performing an accelerated bit error rate measurement (ABERM);
   testing whether the ABERM was successful;
   calculating and setting the transmitter power to achieve the target maximum bit error rate when the ABERM is successful;
   determining whether the bit error rate can be increased when the ABERM is not successful;
   determining whether more power is needed than is available to achieve the target maximum bit error rate;
   reporting an error if more power is needed than is available for the target maximum bit error rate; and
   running the ABERM with a new target maximum bit error rate when it is determined that more power is needed than is available.

2. The method of claim 1, wherein performing an accelerated bit error rate measurement, is further comprising:
   running a linear feedback shift register (LFSR) configured to generate the test and checker data;
   reducing transmitter power to a level such that the accelerated bit error rate measurement can be accelerated;
   checking the bit error rate at the reduced transmitter power;
   determining whether the error rate is at least equal to a predetermined value;
   setting a value for a number of measurements to be taken;
   recording an error rate and a transmitter power at an initial transmitter power;
   increasing the transmitter power;
   recording the error rate and the transmit power until a predetermined value for the number of measurements has been obtained;
   performing a linear fit of data points;
   calculating the transmit power for a target bit error rate;
   determining whether the transmit power for the target bit error rate is possible;
   reporting an error if the transmit power for the target bit error rate is not possible and setting the transmit power to a maximum; and
   setting the transmit power for the target bit error rate when the transmit power is possible.

* * * * *